(12) United States Patent
Czapla et al.

(10) Patent No.: US 12,104,554 B2
(45) Date of Patent: Oct. 1, 2024

(54) AIRCRAFT PROPULSION ASSEMBLY EQUIPPED WITH A THRUST-REVERSING DEVICE COMPRISING AT LEAST ONE INFLATABLE BARRIER, AND AIRCRAFT COMPRISING AT LEAST ONE SUCH PROPULSION ASSEMBLY

(71) Applicant: Airbus Operations SAS, Toulouse (FR)

(72) Inventors: Lionel Czapla, Toulouse (FR);
Benjamin Thubert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/484,548

(22) Filed: Oct. 11, 2023

(65) Prior Publication Data

US 2024/0125284 A1    Apr. 18, 2024

(30) Foreign Application Priority Data

Oct. 13, 2022 (FR) ...................... 2210561

(51) Int. Cl.
*F02K 1/64* (2006.01)
*F02K 1/32* (2006.01)

(52) U.S. Cl.
CPC ............... *F02K 1/32* (2013.01); *F02K 1/645* (2013.01)

(58) Field of Classification Search
CPC ..... F02K 1/56; F02K 1/54; F02K 1/62; F02K 1/625; F02K 1/645; F02K 1/64; F02K 1/70; F02K 1/72; F02K 1/32
See application file for complete search history.

(56) References Cited

U.S. PATENT DOCUMENTS

| 3,599,432 A | 8/1971 | Ellis |
| 2019/0032601 A1 | 1/2019 | Harpal et al. |
| 2022/0228541 A1* | 7/2022 | Porte .................. F02K 1/62 |
| 2022/0243681 A1 | 8/2022 | West |

FOREIGN PATENT DOCUMENTS

| FR | 3077847 A1 | 8/2019 |
| GB | 965992 A | 8/1964 |
| WO | WO 2008045057 | * 4/2008 |

OTHER PUBLICATIONS

French Search Report for corresponding French Patent Application No. 2210561 dated Apr. 27, 2023; priority document.

* cited by examiner

*Primary Examiner* — Gerald L Sung
(74) *Attorney, Agent, or Firm* — Greer, Burns & Crain, Ltd.

(57) ABSTRACT

An aircraft propulsion assembly equipped with a thrust-reversing device which includes at least one lateral aperture, passing through the nacelle of the propulsion assembly, configured to be in an open state or a closed state, at least one inflatable barrier configured to be in a deflated state in which the barrier does not protrude into an annular duct channeling a flow of air and an inflated state in which the barrier, substantially rigid or semi-rigid, is deployed and extends across the annular duct to deflect at least a part of the flow of air toward the lateral aperture, and at least one supply system configured to supply the inflatable barrier with fluid. An aircraft is provided which includes at least one such propulsion assembly.

12 Claims, 5 Drawing Sheets

Fig. 17

AIRCRAFT PROPULSION ASSEMBLY EQUIPPED WITH A THRUST-REVERSING DEVICE COMPRISING AT LEAST ONE INFLATABLE BARRIER, AND AIRCRAFT COMPRISING AT LEAST ONE SUCH PROPULSION ASSEMBLY

CROSS-REFERENCES TO RELATED APPLICATIONS

This application claims the benefit of the French patent application No. 2210561 filed on Oct. 13, 2022, the entire disclosures of which are incorporated herein by way of reference.

FIELD OF THE INVENTION

The present application relates to an aircraft propulsion assembly equipped with a thrust-reversing device comprising at least one inflatable barrier and an aircraft comprising at least one such propulsion assembly.

BACKGROUND OF THE INVENTION

According to an embodiment visible in FIGS. 1 to 4, an aircraft 10 comprises several propulsion assemblies 12 positioned under each of the wings 14 of the aircraft 10 and linked to the wings by pylons 16. Each propulsion assembly 12 comprises a turbojet engine 18 positioned inside a nacelle 20.

Hereinafter in the description, a longitudinal direction is parallel to the axis of rotation A18 of the turbojet engine 18 and a radial direction is at right angles to the axis of rotation A18. A transverse plane is a plane at right angles to the axis of rotation A18. The notions of front/rear, denoted Av/Ar, or upstream/downstream, refer to the direction of flow of an airflow 12 in the nacelle 20, this airflow, represented in FIG. 1 by an arrow, flowing from front (Av) to rear (Ar).

The nacelle 20 has an approximately tubular form and delimits, with the turbojet engine 18, an annular duct 24. It comprises, from front to rear, a front part 26 via which the airflow 22 enters and a rear part 28 via which the airflow 22 exits.

The nacelle 20 comprises a thrust-reversing device 30 configured to be in activated state (visible in FIGS. 2 and 4) in which it deflects at least a part of the airflow 22 circulating in the annular duct 24 out toward the outside and the front of the nacelle 20, and an inactivated state (visible in FIGS. 1 and 3) in which it does not deflect the airflow 22 circulating in the annular duct 24.

The thrust-reversing device 30 comprises at least one movable part 32 making it possible to generate at least one lateral aperture 34 (visible in FIGS. 2 and 4) through which the deflected airflow is oriented.

According to one embodiment, the movable part 32 corresponds to the rear part 28 of the nacelle 20, which is translated in the longitudinal direction between an upstream position in which the rear part 28 is in contact with the front part 26 when the thrust-reversing device 30 is in the inactivated state and a downstream position (visible in FIGS. 2 and 4) in which the rear part 28 is separated from the front part 26 so as to generate lateral apertures 34 when the thrust-reversing device 30 is in the activated state.

The thrust-reversing device 30 also comprises rigid doors 36 configured to deflect at least a part of the airflow 22 circulating in the annular duct 24 toward a lateral aperture 34 and cascades 38 positioned at the lateral apertures 34. These cascades 38 are configured to control the orientation of the flow deflected by the doors 36.

Figure 1:
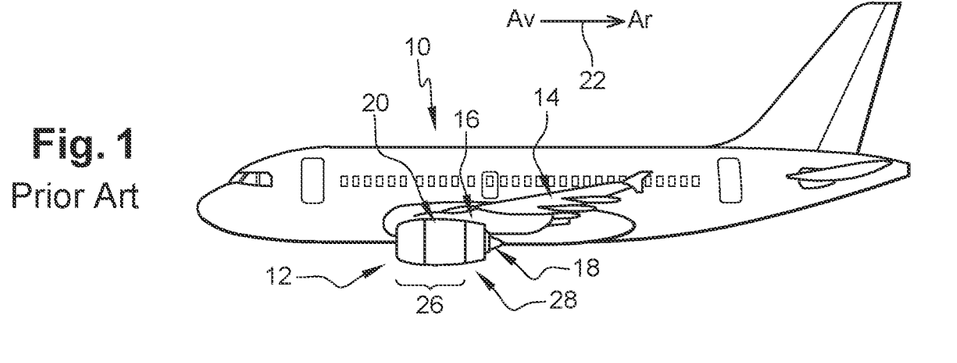
FIG. 1 is a lateral view of an aircraft.
Figure 2:
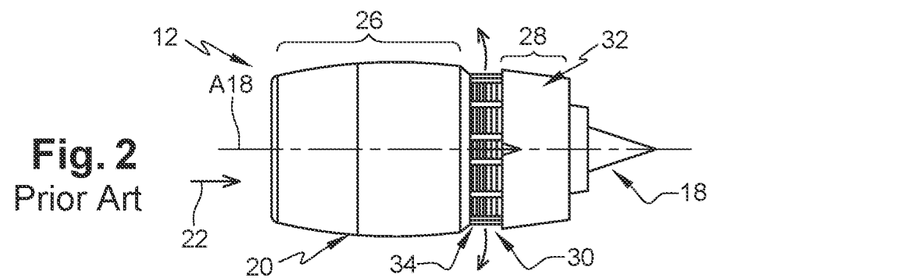
FIG. 2 is a lateral view of a propulsion assembly equipped with a thrust-reversing device in the activated state illustrating an embodiment of the prior art.
Figure 3:
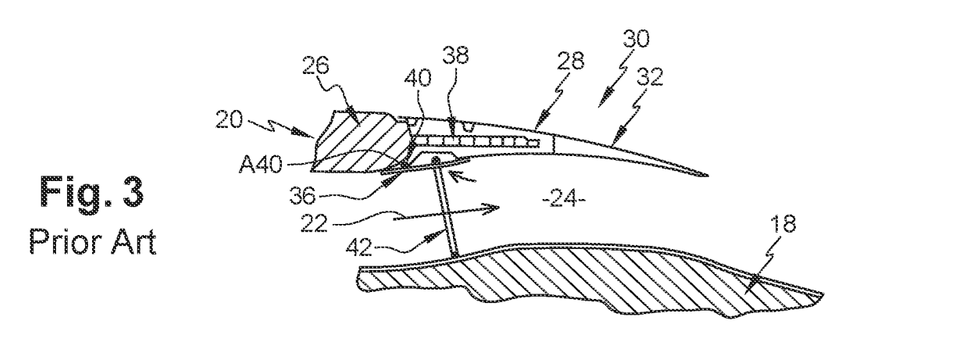
FIG. 3 is a longitudinal cross-section of a thrust-reversing device in the inactivated state illustrating an embodiment of the prior art.
Figure 4:
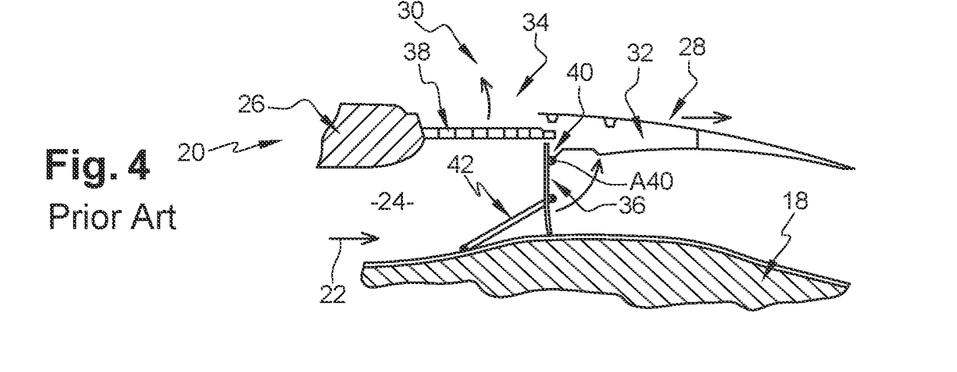
FIG. 4 is a longitudinal cross-section of the thrust-reversing device visible in FIG. 3 in the activated state.

Each door 36 is movable between a folded down position, visible in FIG. 3, when the thrust-reversing device 30 is in the inactivated state, in which the door 36 does not protrude into the annular duct 24, and a deployed position, visible in FIG. 4, when the thrust-reversing device 30 is in the activated state, in which the door 36 extends across the annular duct 24 to deflect at least a part of the airflow 22 circulating therein toward the lateral apertures 34.

According to one configuration, each door 36 is linked to the movable part 32 by an articulation 40 comprising an axis of rotation A40 substantially at right angles to the axis of rotation A18 and to a radial direction.

In addition, the thrust-reversing device 30 comprises, for each door 36, at least one connecting rod 42, linking the door 36 and the turbojet engine 18, which makes it possible to pivot the door 36 from the folded down position to the deployed position and vice versa when the rear part 28 is translated.

The doors 36, their articulations 40 and the connecting rods 42 are metal or made of composite material and dimensioned to withstand the forces generated by the airflow 22 when the thrust-reversing device is in the activated state. Consequently, they have a weight that is not inconsiderable which impacts the energy consumption of the aircraft.

The present invention aims to remedy all or part of the drawbacks of the prior art.

SUMMARY OF THE INVENTION

To this end, a subject of the invention is an aircraft propulsion assembly comprising a powering system, a nacelle surrounding the powering system, an annular duct between the powering system and the nacelle in which, in operation, an flow of air circulates from upstream to downstream and a thrust-reversing device comprising at least one lateral aperture passing through the nacelle, configured to be in an open state or a closed state, and at least one barrier configured to be in a folded down position in which the barrier does not protrude into the annular duct and a deployed position in which the barrier extends across the annular duct to deflect at least a part of the flow of air circulating in the annular duct toward the lateral aperture, the barrier having a first edge secured to the nacelle and a second edge at a distance from the first edge and configured to be in contact with the powering system in deployed position.

According to the invention, at least one barrier is inflatable and configured to be in a deflated state, in the folded down position, in which the barrier is flexible, and an inflated state, in deployed position, in which the barrier is substantially rigid or semi-rigid. In addition, the thrust-reversing device comprises at least one supply system configured to supply the inflatable barrier with fluid.

This solution makes it possible to reduce the embedded weight because the inflatable barriers are lighter than the doors of the prior art and require neither articulation nor connecting rod to cause the deployment thereof.

According to another feature, the thrust-reversing device comprises at least one holding system configured to hold the inflatable barrier in deployed position, the holding system comprising at least one flexible link having a first end linked to the nacelle and a second end linked to the second edge of the inflatable barrier.

According to another feature, the nacelle comprises a front part and a rear part that is movable between an upstream position in which the rear part is in contact with the front part, and a downstream position in which the rear part is spaced apart from the front part, the lateral aperture being situated between the front and rear parts. In addition, the flexible link being linked to an attachment point of the rear part, the holding system comprises at least one pulley linked to a fixed structure of the nacelle and configured to guide the flexible link, the pulley and the attachment point being arranged such that the attachment point is offset upstream with respect to the pulley when the rear part is in upstream position and during a part of a movement of the rear part from the upstream position to the downstream position.

According to another feature, the holding system comprises first and second pulleys linked to the fixed structure of the nacelle, the second pulley being offset upstream with respect to the first pulley, the flexible link running, from its first end, over the first pulley then over the second pulley. In addition, the first and second pulleys and the attachment point are arranged such that the attachment point is positioned in line with or in proximity to the second pulley when the rear part is in upstream position and in line with or in proximity to the first pulley when the rear part is in downstream position.

According to another feature, the supply system comprises an air take-off system on the powering system.

According to another feature, the supply system comprises:
a main duct in which a fluid provided to inflate the inflatable barrier circulates from upstream to downstream, the main duct comprising a section reduction,
a first secondary duct having a first end emerging in the main duct upstream of the section reduction, a second end linked to the inflatable barrier and a first valve configured to be in a passing state in which the first valve allows a flow to circulate from the first end to the second end and a blocked state in which the first valve prevents any flow between the first and second ends,
a second secondary duct having a first end emerging in the main duct in line with the section reduction, a second end linked to the inflatable barrier and a second valve configured to be in a passing state in which the second valve allows a flow to circulate from the second end to the first end and a blocked state in which the second valve prevents any flow between the first and second ends.

According to another feature, the supply system comprises a chamber containing a fluid provided to inflate the inflatable barrier and connected with the inflatable barrier, and a piston configured to modify the volume of the chamber.

According to another feature, the nacelle comprises a front part and a rear part that is movable between an upstream position in which the rear part is in contact with the front part and a downstream position in which the rear part is spaced apart from the front part. In addition, the lateral aperture being situated between the front and rear parts, the rear part comprises at least one housing that is open toward the front part and configured to at least partially house the inflatable barrier in the deflated state.

According to another feature, the thrust-reversing device comprises at least one passage making it possible to connect the housing and the annular duct when the rear part is in the upstream position and, for each passage, at least one hatch that is movable between a closed position in which the hatch shuts the passage and an open position in which the hatch frees the passage.

According to another feature, the thrust-reversing device comprises, for each hatch, an extension secured to the hatch and at least one fixed stop secured to the fixed structure of the nacelle, the extension and the fixed stop being arranged such that the hatch swivels automatically into closed position upon a movement of the rear part from the downstream position to the upstream position.

According to another feature, the inflatable barrier comprises at least one reinforcement at least at the second edge.

According to another feature, the inflatable barrier comprises at least one orifice passing through it and making it possible, when the inflatable barrier is in the inflated state, to connect a zone of the annular duct situated upstream of the inflatable barrier and a zone of the annular duct situated downstream.

According to different embodiments, the inflatable barrier comprises:
at least one non-inflatable zone bracketed by an inflatable zone;
at least one first inflatable zone in the form of an inflatable plate bracketed by a second inflatable zone in the form of an inflatable boot;
a single inflatable zone which extends over the entire surface area of the inflatable barrier.

Another subject of the invention is an aircraft comprising at least one propulsion assembly according to one of the preceding features.

BRIEF DESCRIPTION OF THE DRAWINGS

Other features and advantages will emerge from the following description of the invention, the description being given purely by way of example, with reference to the attached drawings in which.

DETAILED DESCRIPTION OF THE PREFERRED EMBODIMENTS

Figure 5:
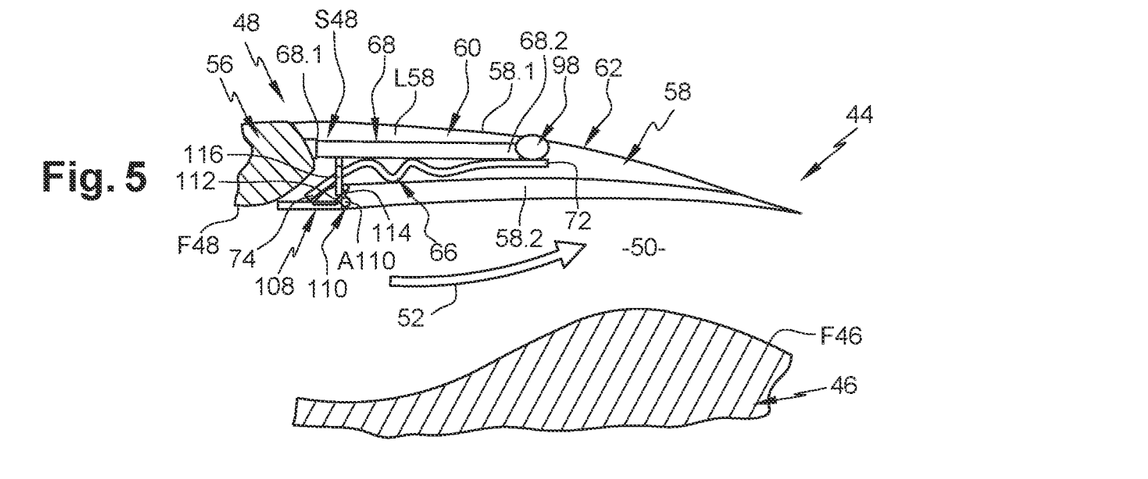
FIG. 5 is a longitudinal cross-section of a thrust-reversing device in the inactivated state illustrating an embodiment of the invention.
Figure 6:
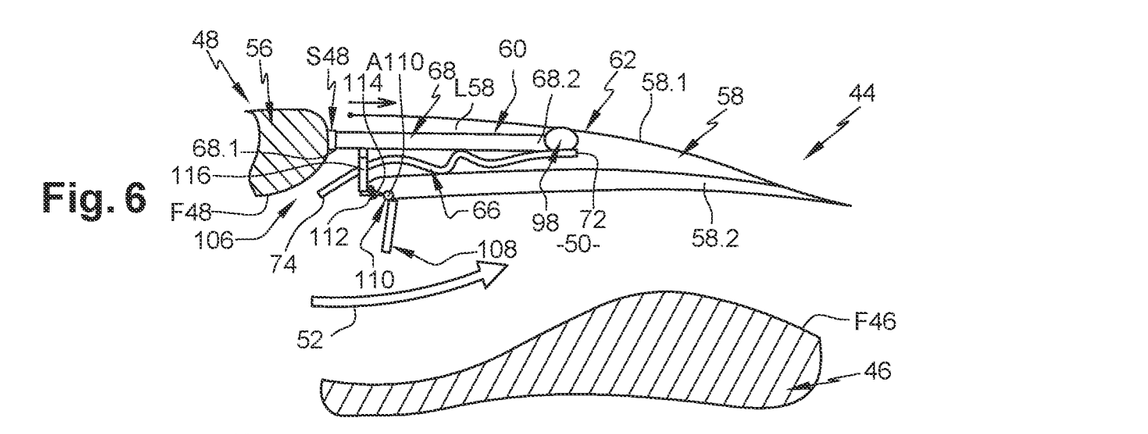
FIG. 6 is a longitudinal cross-section of the thrust-reversing device visible in FIG. 5 during activation.
Figure 7:
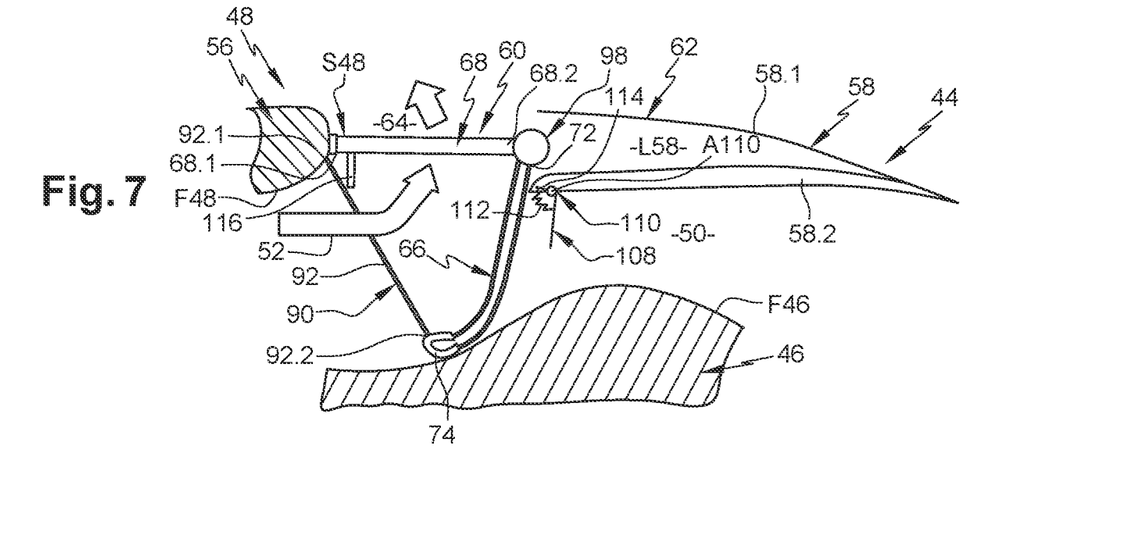
FIG. 7 is a longitudinal cross-section of the thrust-reversing device visible in FIG. 5 in the activated state.

According to an embodiment visible in FIGS. 5 to 7, a propulsion assembly 44 of an aircraft comprises a powering system 46, such as a turbojet engine, having an outer surface F46, a nacelle 48 surrounding the powering system 46 and having an inner surface F48 at a distance from the outer surface F46 of the powering system 46 and an annular duct 50, delimited by the powering system 46 (more particularly its outer surface F46) and the nacelle 48 (more particularly its inner surface F48), which extends between an intake and an outlet and in which a flow of air 52 circulates in operation.

Figure 11:
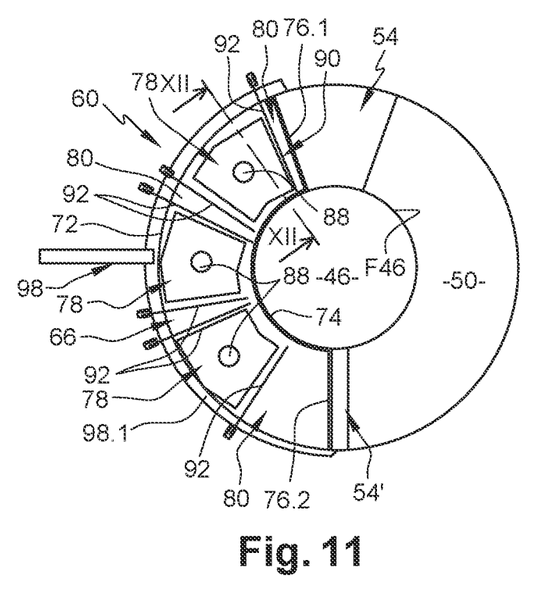
FIG. 11 is a front view of a thrust-reversing device in the activated state illustrating an embodiment of the invention.
Figure 13:
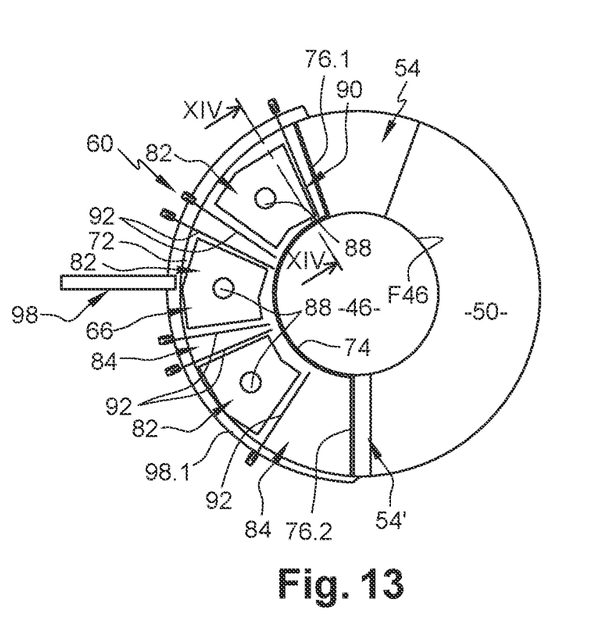
FIG. 13 is a front view of a thrust-reversing device in the activated state illustrating another embodiment of the invention.
Figure 15:
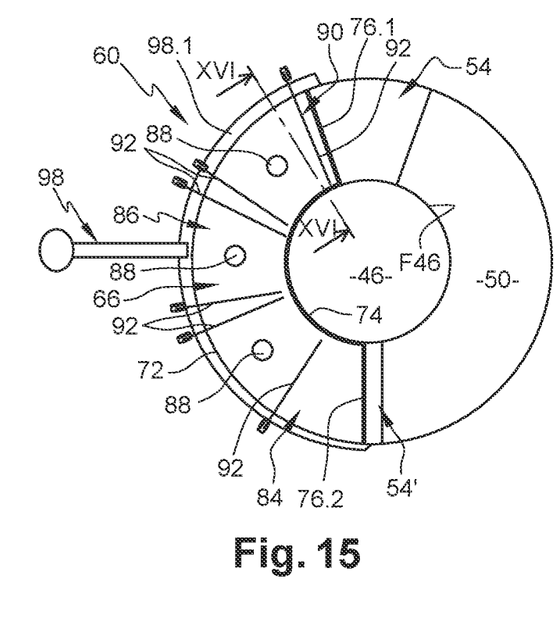
FIG. 15 is a front view of a thrust-reversing device in the activated state illustrating another embodiment of the invention.

According to an arrangement visible in FIGS. 11, 13, 15, the propulsion assembly 44 comprises at least one bifurcation 54, linking the powering system 46 and the nacelle 48, which extends in the annular duct 50. According to one configuration, the propulsion assembly 44 comprises a top bifurcation 54, positioned at 12 o'clock in the annular duct 50, and a bottom bifurcation 54' positioned at 6 o'clock in the annular duct 50.

The nacelle 48 comprises, from front to rear, a front part 56 comprising the intake of the annular duct 50 via which the flow of air 52 enters and a rear part 58 comprising the outlet of the annular duct 50 via which the flow of air 52 exits.

The propulsion assembly 44 comprises a thrust-reversing device 60, positioned on the nacelle 48, comprising at least one movable part 62 configured to be in a first state, visible in FIGS. 5 and 6, in which the movable part 62 generates no aperture through the nacelle 48 and a second state, visible in FIG. 7, in which the movable part 62 generates at least one lateral aperture 64 passing through the nacelle 48, positioned between the intake and the outlet of the annular duct 50.

According to one configuration, the movable part 62 corresponds to the rear part 58 of the nacelle 48 which is movable with respect to a fixed structure S48 of the nacelle 48 and configured to be moved between an upstream position in which the rear part 58 is in contact with the front part 56, corresponding to the first state of the movable part 62 and to a closed state of the lateral aperture or apertures 64 as illustrated in FIGS. 5 and 6, and a downstream position in which the rear part 58 is spaced apart from the front part 56, corresponding to the second state of the movable part 62 and to an open state of the lateral aperture or apertures 64 as illustrated in FIG. 7, the lateral aperture or apertures 64 being positioned between the front and rear parts 56, 58.

The thrust-reversing device 60 also comprises at least one barrier 66 that is movable between a folded down position, as illustrated in FIGS. 5 and 6, in which the barrier 66 does not extend into the annular duct 50 and does not interfere with the flow of air 52 circulating in the annular duct 50, and a deployed position, as illustrated in FIG. 7, in which the barrier extends across the annular duct 50 and at least partially deflects the flow of air 52 circulating in the annular duct 50 toward at least one lateral aperture 64 in the open state.

According to one configuration, each barrier 66 is positioned to the rear of a lateral aperture 64 when the latter is in the open state and extends from the nacelle 48 to the powering system 46, in deployed position.

The thrust-reversing device 60 is configured to be in an inactivated state when the lateral aperture or apertures 64 is or are in the closed state and the barrier or barriers 66 is or are in folded down position, the flow of air 52 circulating in the annular duct 50 from the intake to the outlet of the nacelle 48, and an activated state when the lateral aperture or apertures 64 is or are in the open state and the barrier or barriers 66 is or are in deployed position, at least a part of the flow of air 52 circulating in the annular duct 50 being deflected toward the lateral aperture or apertures 64.

The thrust-reversing device 60 also comprises at least one cascade 68 positioned at a lateral aperture 64, at least when the latter is in the open state, configured to control the orientation of the flow of air 52 deflected by the barrier or barriers 66. Each cascade 68 corresponds to a part of the fixed structure S48 of the nacelle 48. Each cascade 68 comprises a front edge 68.1 oriented toward the front of the nacelle 48 and a rear edge 68.2 oriented toward the rear of the nacelle 48.

According to one configuration, the rear part 58 comprises an outer wall 58.1 forming a part of the outer surface of the nacelle 48, an inner wall 58.2 forming a part of the inner surface F48 of the nacelle 48 and at least one housing L58 that is open upstream toward the front part 56, between the outer and inner walls 58.1, 58.2. According to this configuration, the cascade or cascades 68 is or are disposed at least partially in the housing L58 of the rear part 58 when the rear part 58 is in the upstream position corresponding to the closed state of the lateral aperture 64, the outer and inner walls 58.1, 58.2 freeing the cascade or cascades 68 when the rear part 58 is in the downstream position corresponding to the open state of the lateral aperture 64.

Figure 17:
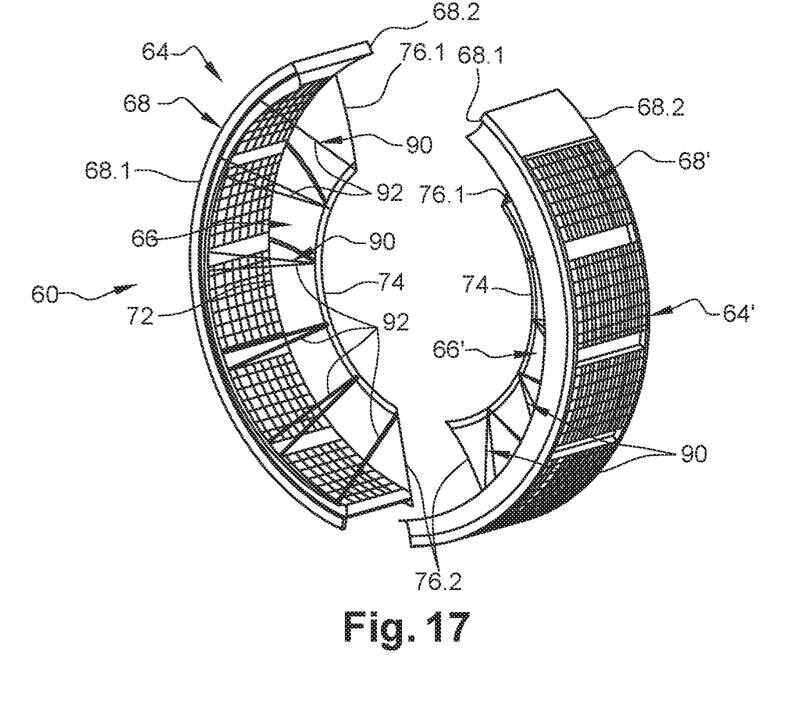
FIG. 17 is a perspective view of a thrust-reversing device in the activated state illustrating an embodiment of the invention.

According to an arrangement visible in FIG. 17, the thrust-reversing device comprises left and right lateral apertures 64, 64' each of which extends between the top and bottom bifurcations 54, 54', at least one cascade 68, 68' for each left or right lateral aperture 64, 64' which extends over virtually the entire surface of the lateral aperture 64, 64', two left and right barriers 66, 66', one for each left and right lateral aperture 64, 64', the left barrier 66 being configured to shut the left part of the annular duct 50 in deployed position by extending from the top bifurcation 54 to the bottom bifurcation 54', the right barrier 66' being configured to shut the right part of the annular duct 50 in deployed position by extending from the top bifurcation 54 to the bottom bifurcation 54'. As a variant, each right or left lateral aperture 64, 64' comprises several barriers 66.

Obviously, the invention is not limited to these arrangements. Whatever the arrangement, the thrust-reversing device 60 comprises at least one lateral aperture 64 configured to be in an open state or a closed state and at least one barrier 66 configured to be in a folded down position in which the barrier 66 does not protrude into the annular duct 50 and a deployed position in which the barrier 66 extends across the annular duct 50 to deflect at least a part of the flow of air 52 circulating in the annular duct 50 toward the lateral aperture 64.

According to the invention, at least one barrier 66 is inflatable and configured to be in a deflated state, in folded down position, in which it is flexible, and an inflated state, in deployed position, in which it is substantially rigid or semi-rigid. The inflatable barrier 66 is made of a flexible material.

Each inflatable barrier 66 comprises a first edge 72, secured to the fixed structure S48 of the nacelle 48, which extends over a part of the circumference of the nacelle 48, a second edge 74, at a distance from the first edge 72, configured to be in contact with the outer surface F46 of the powering system 46 when the inflatable barrier 66 is in the inflated state, and radial edges 76.1, 76.2 linking the first and second edges 72, 74. When the inflatable barrier 66 is in the inflated state, it extends over at least one angular segment of the annular duct 50. According to a configuration visible in FIG. 11, the thrust-reversing device 60 comprises two inflatable barriers 66, 66', each of them having a first radial edge 76.1 attached to the top bifurcation 54 and a second radial edge 76.2 attached to the bottom bifurcation 54' when the inflatable barriers 66, 66' are in the inflated state.

According to one arrangement, the first edge 72 extends along the rear edge 68.2 of the cascade 68 toward which the inflatable barrier 66 orients at least a part of the flow of air 52 in the inflated state.

According to a configuration visible in FIG. 7, the inflatable barrier 66 comprises at least one reinforcement, such as an over thickness or an inflatable boot, at least at the second edge 74 and configured to be in contact with the outer surface F46 of the powering system 46 when the inflatable barrier 66 is in the inflated state.

Figure 9:
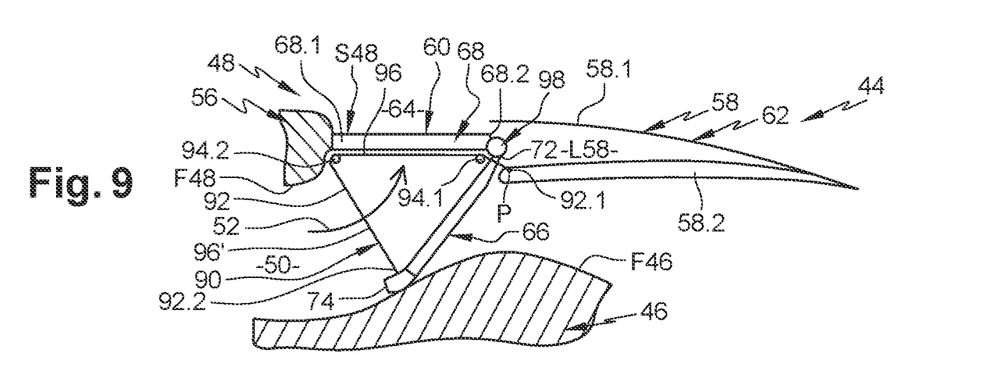
FIG. 9 is a longitudinal cross-section of the thrust-reversing device visible in FIG. 8 in the activated state.
Figure 12:
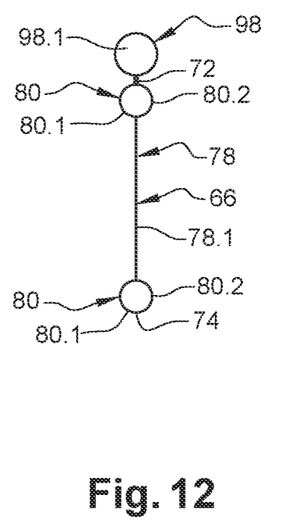
FIG. 12 is a cross section along the line XII-XII of FIG. 11.

According to an embodiment visible in FIGS. 9, 11 and 12, at least one inflatable barrier 66 comprises at least one non-inflatable zone 78 in line with which the inflatable barrier 66 comprises a single skin 78.1, and at least one inflatable zone 80 in line with which the inflatable barrier 66 has two skins 80.1, 80.2 that are spaced apart, delimiting a cavity for a fluid. At least one inflatable zone 80 takes the form of an inflatable boot. According to one arrangement, the inflatable barrier 66 comprises at least one non-inflatable zone 78 bracketed by an inflatable zone 80 in the form of an inflatable boot. As illustrated in FIG. 11, the inflatable barrier 66 comprises several non-inflatable zones 78 each bracketed by an inflatable zone 80 in the form of an inflatable boot.

Figure 14:
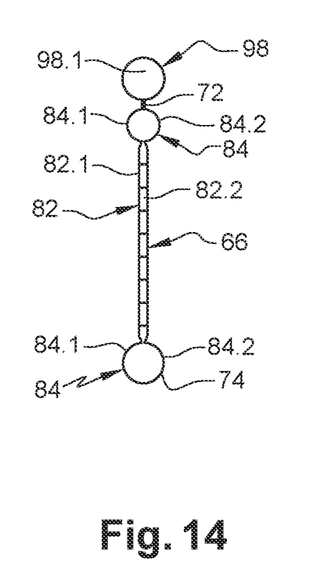
FIG. 14 is a cross-section along the line XIV-XIV of FIG. 13.

According to another embodiment visible in FIGS. 13 and 14, at least one inflatable barrier 66 comprises at one first inflatable zone 82 having two skins 82.1, 82.2 that are slightly spaced apart forming an inflatable plate, and at least one second inflatable zone 84 having two skins 84.1, 84.2 forming an inflatable boot. According to one arrangement, the inflatable barrier 66 comprises at least one first inflatable zone 82 bracketed by a second inflatable zone 84 in the form of an inflatable boot. As illustrated in FIG. 13, the inflatable barrier 66 comprises several first inflatable zones 82, each in inflatable plate form, each bracketed by a second inflatable zone 84 in the form of an inflatable boot. The skins 82.1 and 84.1 of the first and second inflatable zones 82, 84 can be one and the same skin. The same applies for the skins 82.2 and 84.2.

Figure 16:
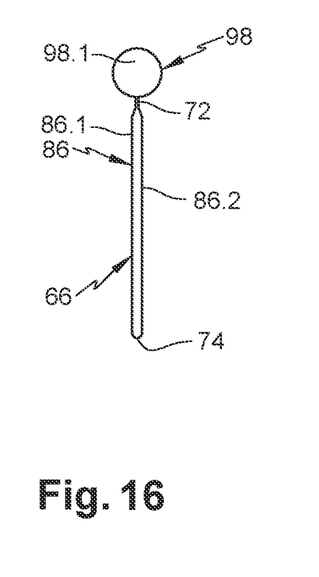
FIG. 16 is a cross-section along the line XVI-XVI of FIG. 15.

According to another embodiment visible in FIGS. 15 and 16, the inflatable barrier 66 comprises a single inflatable zone 86 which extends over the entire surface area of the inflatable barrier 66 and has two skins 86.1, 86.2 that are slightly spaced apart forming an inflatable plate.

Obviously, the invention is not limited to these embodiments for the inflatable barrier 66. Whatever the embodiment, the inflatable barrier 66 comprises at least one inflatable zone 80 to 86 making it possible to rigidify the inflatable barrier 66 in the inflated state. Likewise, the inflatable barrier 66 can combine the embodiments visible in FIGS. 11 and 13 over different angular sectors.

According to one configuration, the inflatable barrier 66 comprises at least one orifice 88 passing through it and making it possible to connect, when the inflatable barrier 66 is in the inflated state, the zone of the annular duct 50 situated upstream of the inflatable barrier 66 and that situated downstream. The number of orifices 88 and the dimensions thereof are adjusted according to the flow rate desired for the flow of air 52 oriented toward the lateral aperture or apertures 64.

According to one configuration, in deployed position, when the inflatable barrier 66 is in the inflated state, the second edge 74 is offset to the front of the nacelle 48 with respect to the first edge 72.

According to one embodiment, the thrust-reversing device 60 comprises at least one holding system 90 configured to hold the inflatable barrier 66 in deployed position, the second edge 74 being offset to the front of the nacelle 48 with respect to the first edge 72, and prevent the second edge 74 of the inflatable barrier 66 from being offset to the rear with respect to its first edge 72.

According to one configuration, the holding system 90 comprises at least one flexible link 92, such as a cable, a rope, a cord, or the like for example, having a first end 92.1 linked to the nacelle 48 and a second end 92.2 linked to the second edge 74 of the inflatable barrier 66.

According to a first variant visible in FIG. 7 for example, the first end 92.1 of the flexible link 92 is linked to the fixed structure S48 of the nacelle 48.

Figure 8:
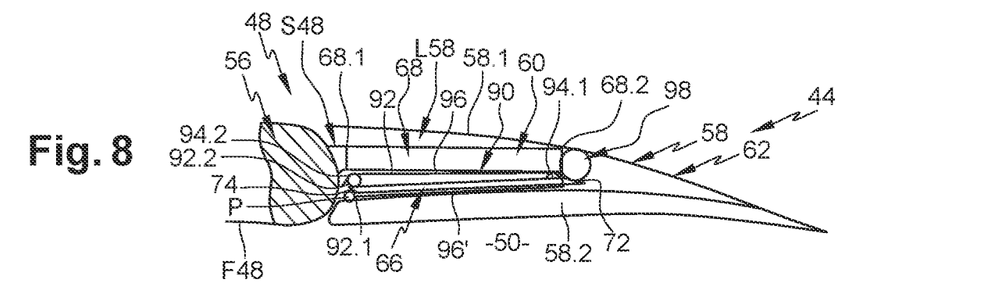
FIG. 8 is a longitudinal cross-section of a thrust-reversing device in the inactivated state illustrating another embodiment of the invention.

According to a second variant visible in FIGS. 8 and 9, the first end 92.1 of the flexible link 92 is linked at an attachment point P of the movable rear part 58 of the nacelle 48, positioned at the front edge of the inner wall 58.2 of the rear part 58. In addition, the holding system 90 comprises a first pulley 94.1 secured to the rear edge 68.2 of the cascade 68, and a second pulley 94.2 offset upstream with respect to the first pulley 94.1, secured to the front edge 68.1 of the cascade 68. Thus, from its first position 92.1, the flexible link 92 runs over the first pulley 94.1 then over the second pulley 94.2 before reaching the second end 92.2. According to this second variant, the flexible link 92 makes it possible not only to hold the inflatable barrier 66 in deployed position but also to pull it toward the nacelle 48 upon the deactivation of the thrust-reversing device 60. When the rear part 58 is in upstream position (the lateral aperture 64 being in the closed state and the inflatable barrier 66 in the deflated state), as illustrated in FIG. 8, the attachment point P is positioned in line with or in proximity to the second pulley 94.2. In this situation, the flexible link 92 comprises two strands 96, 96' that are substantially parallel. When the rear part 58 is in downstream position (the lateral aperture 64 being in the open state and the inflatable barrier 66 in the inflated state), as illustrated in FIG. 8, the attachment point P is positioned in line with or in proximity to the first pulley 94.1. In this situation, the flexible link 92 comprises a first strand 96 which extends substantially parallel to the cascade 68 and a second strand 96' which extends across the annular duct 50. Upon the deactivation of the thrust-reversing device 60, the flexible link 92 being linked to the movable rear part 58, the translational movement of the rear part 58 generates a traction of the flexible link 92 on the second edge 74 of the inflatable barrier 66 toward the nacelle 48. This variant favors the return to folded down position of the inflatable barrier 66.

According to a simplified variant, the holding system 90 comprises at least one pulley 94.1 linked to the fixed structure S48 of the nacelle 48 and guiding the flexible link 92, the pulley 94.1 and the attachment point P linking the flexible link 92 and the rear part 58 being arranged such that the attachment point P is offset upstream with respect to the pulley 94.1 when the rear part 58 is in upstream position and during a part of the translational movement of the rear part 58 to the downstream position.

As illustrated in FIGS. 11, 13, 15, a holding system 90 comprises several links 92 for the same inflatable barrier 66, distributed over the circumference of the annular duct 50 and linked to the most rigid zones of the inflatable barrier 66.

According to one embodiment, the thrust-reversing device 60 comprises at least one supply system 98 configured to supply at least one inflatable barrier 66 with a fluid. According to one configuration, the supply system 98 comprises an air take-off system at the powering system 46 that is also used to supply an air-conditioning system of a passenger cabin of the aircraft.

According to one configuration, the supply system 98 is configured not only to inflate the inflatable barrier 66 but also to deflate it.

According to one embodiment, the supply system 98 comprises:
  a main duct 100 in which the fluid provided to inflate the inflatable barrier 66 circulates, the main duct 100 comprising a section reduction 100.1,
  a first secondary duct 102 having a first end 102.1 emerging in the main duct 100 upstream of the section reduction 100.1, a second end 102.2 linked to the inflatable barrier 66 and a first valve 102.3 (positioned between the first and second ends 102.1, 102.2) configured to be in a passing state in which it allows a flow to circulate from the first end 102.1 to the second end 102.2 and a blocked state in which it prevents any flow between the first and second ends 102.1, 102.2,
  a second secondary duct 104 having a first end 104.1 emerging in the main duct 100 in line with the section reduction 100.1, a second end 104.2 linked to the inflatable barrier 66 and a second valve 104.3 (positioned between the first and second ends 104.1, 104.2) configured to be in a passing state in which it allows a flow to circulate from the second end 104.2 to the first end 104.1 and a blocked state in which it prevents any flow between the first and second ends 104.1, 104.2.

Figure 10A:
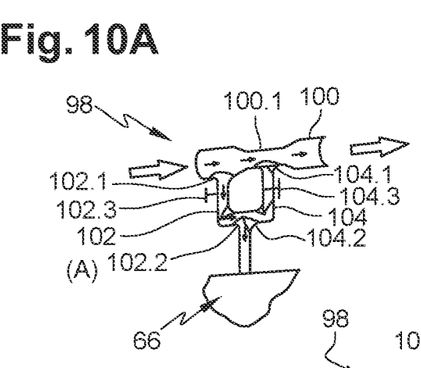
FIGS. 10A, 10B and 10C represent perspective views of a part of a supply system during an inflation operation (FIG. 10A), in the absence of inflation or deflation operation (FIG. 10B) and during a deflation operation (FIG. 10C)
Figure 10B:
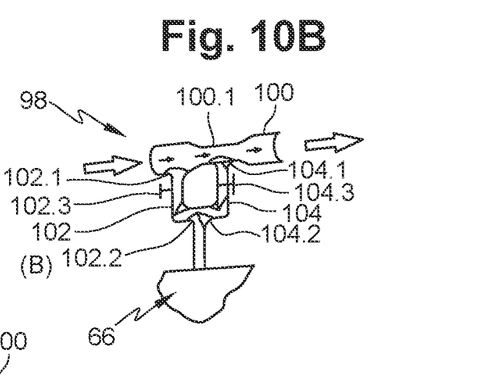
Figure 10C:
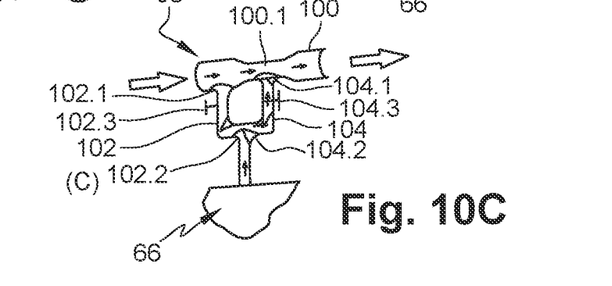

As illustrated in the part (A) of FIG. 10, when the first valve 102.3 is in the passing state and the second valve 104.3 in the blocked state, the fluid circulating in the main duct 100 is at least partially deflected because of the section reduction 100.1 toward the first secondary duct 102 to supply the inflatable barrier 66. As illustrated in the part (B) of FIG. 10, when the first and second valves 102.3, 104.3 are in the blocked state, no fluid passes between the main duct 100 and the inflatable barrier 66. As illustrated in the part (C) of FIG. 10, when the first valve 102.3 is in the blocked state and the second valve 104.3 in the passing state, the fluid circulating in the main duct 100 sucks, by venturi effect, the fluid into the second secondary duct 104, causing the deflation of the inflatable barrier 66.

According to another embodiment, the supply system 98 comprises a piston configured to modify the volume of a chamber containing the fluid provided to inflate the inflatable barrier 66 and connected with at least one inflatable barrier 66. When the piston reduces the volume of the chamber, this causes the transfer of the fluid contained in the chamber to the inflatable barrier 66. When the piston increases the volume of the chamber, this causes a suction of the fluid contained in the inflatable barrier 66 to the chamber.

According to one configuration, one supply duct 98.1 extends over the entire length of the first edge 72 of the inflatable barrier 66, as illustrated in FIGS. 11, 13 and 15.

Obviously, the invention is not limited to these embodiments for the supply system 98.

According to one embodiment, the housing L58 of the rear part 58 of the nacelle 48 is configured to at least partially house the inflatable barrier 66 in the deflated state.

According to a configuration visible in FIGS. 5 to 7, the rear part 58 is configured such that the inner wall 58.2 is separated from the front part 56 when the rear part 58 is in the upstream position (corresponding to the closed state of the lateral aperture or apertures 64). Thus, the thrust-reversing device 60 comprises at least one passage 106 (visible in FIG. 6), between the inner wall 58.2 of the rear part 58 and the front part 56, making it possible to connect the housing L58 and the annular duct 50 when the rear part 58 is in the upstream position. In addition, the thrust-reversing device 60 comprises, for each passage 106, at least one hatch 108 that is movable between a closed position in which it shuts the passage 106 and an open position in which it frees the passage 106. According to one arrangement, each hatch 108 is linked to the rear part 58 by an articulation 110 comprising a pivoting axis A110 positioned in a transverse plane substantially at right angles to a radial direction.

According to one arrangement, the nacelle 48 comprises two passages 106, one to the right of the top and bottom bifurcations 54, 54' and another to the left, as well as, for each passage 106, several hatches 108 distributed over the circumference of the nacelle 48.

According to one embodiment, the thrust-reversing device 60 comprises, for each hatch 108, at least one spring 112 inserted between the rear part 58 and the corresponding hatch 108 and configured to push the hatch 108 into open position.

According to one configuration, each hatch 108 comprises an extension 114 and the thrust-reversing device 60 comprises, for each hatch 108, at least one fixed stop 116 secured to the fixed structure S48 of the nacelle 48, the extension 114 and the fixed stop 116 being arranged such that the hatch 108 swivels automatically into closed position upon a movement of the rear part 58 from the downstream position to the upstream position.

More specifically, the extension 114 and the fixed stop 116 are arranged such that:
  in the upstream position of the rear part 58, the extension 114 and the fixed stop 116 are in contact with one another, the hatch 108 being in closed position despite the effort of the spring 112,
  upon movement of the rear part 58 toward the rear, the extension 114 separates from the fixed stop 116 and no longer retains the hatch 108 in closed position which pivots because of its weight and/or the effort of the spring 112, as illustrated in FIG. 6,
  upon movement of the rear part 58 toward the front, when it approaches the upstream position, the extension 114 bears against the fixed stop 116, the translation of the rear part 58 causing the pivoting of the hatch 108 into closed position against the effort of the spring 112.

The hatches 108 promote the return into the housing L58 of the inflatable barrier 66. The mechanism for automatic closure of the hatches 108 upon the translational movement of the rear part 58 does not require any actuator, which helps to avoid increasing the weight of the thrust-reversing device.

Obviously, the thrust-reversing device 60 could operate without passages 106 and without hatches 108.

The principle of operation of the thrust-reversing device 60 is now described with reference to the various figures.

When the thrust-reversing device 60 is in the inactivated state, each inflatable barrier 66 in the deflated state is in a housing L58, the rear part 58 of the nacelle 48 is in the upstream position attached to the front part 56, the lateral apertures 64 are in the closed state and the hatches 108 are in the closed position, as illustrated in FIGS. 5 and 8.

When the thrust-reversing device 60 is switched to the activated state, the rear part 58 is translated progressively toward the rear. At the start of travel, this translation to the rear causes the opening of the hatches 108 which swivel into open position, as illustrated in FIG. 6. The rear part 58 is translated until it reaches its downstream position so as to obtain a complete opening of the lateral apertures 64.

The inflation of the inflatable barriers 66 causes the deployment of each of them into the annular duct 50 until the second edge 74 is in contact with the powering system 46. Consequently, at least a part of the flow of air 52 circulating in the annular duct 50 is deflected toward the lateral apertures 64.

The flexible links 92 make it possible to hold the inflatable barriers 66 in contact with the powering system 46 and prohibit the inflatable barriers 66 from being folded toward the rear in the annular duct 50.

Upon the deactivation of the thrust-reversing device 60, the inflatable barriers 66 are deflated. The rear part 58 is translated toward the front toward the front part 56. Upon this translational movement, each inflatable barrier 66 returns into its housing L58. According to the embodiment visible in FIGS. 8 and 9, the flexible links 92 pull on the second edge 74 of each inflatable barrier 66 toward its housing L58.

On approaching the front part 56, as illustrated in FIG. 6, for each hatch 108, its extension 114 bears against the corresponding fixed stop 116 and the translation of the rear part 58 causes the pivoting of each hatch 108 into closed position. This pivoting movement of the hatches 108 promotes the return of each inflatable barrier 66 into its housing L58.

When the rear part 58 is in contact with the front part 56, the lateral apertures 64 are in the closed state, the hatches 108 in the closed position and each inflatable barrier 66 in the deflated state in its housing L58. The thrust-reversing device is in the inactivated state. The thrust-reversing device of the invention makes it possible to reduce the embedded weight because the inflatable barriers 66 are lighter than the reinforced doors of the prior art and require neither articulation nor connecting rod to cause their deployment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft propulsion assembly comprising:
a powering system,
a nacelle surrounding the powering system,
an annular duct, between the powering system and the nacelle in which, in operation, a flow of air circulates from upstream to downstream,
a thrust-reversing device comprising at least one lateral aperture, passing through the nacelle and configured to be in an open state or a closed state, and
at least one inflatable barrier configured to be in a folded down position in which the at least one inflatable barrier does not protrude into the annular duct and a deployed position in which the at least one inflatable barrier extends across the annular duct to deflect at least a part of the flow of air circulating in the annular duct toward the at least one lateral aperture, the at least one inflatable barrier having a first edge secured to the nacelle and a second edge at a distance from the first edge and configured to be in contact with the powering system in deployed position;
wherein at least one inflatable barrier is configured to be in a deflated state, in the folded down position, in which the at least one inflatable barrier is flexible, and an inflated state, in a deployed position, in which the at least one inflatable barrier is substantially rigid or semi-rigid, and
wherein the thrust-reversing device comprises at least one supply system configured to supply the at least one inflatable barrier with a fluid,
wherein the thrust-reversing device comprises at least one holding system configured to hold the at least one inflatable barrier in the deployed position, and
wherein the holding system comprises at least one flexible link having a first end linked to the nacelle and a second end linked to the second edge of the at least one inflatable barrier,
wherein the nacelle comprises a front part and a rear part that is movable between an upstream position in which the rear part is in contact with the front part and a downstream position in which the rear part is spaced apart from the front part, the at least one lateral aperture being situated between the front and rear parts,
wherein the flexible link is linked to an attachment point of the rear part, and
wherein the holding system comprises at least one pulley linked to a fixed structure of the nacelle and configured to guide the flexible link, the at least one pulley and the attachment point being arranged such that the attachment point is offset upstream with respect to the at least one pulley when the rear part is in the upstream position and during a part of a movement of the rear part from the upstream position to the downstream position.

2. The aircraft propulsion assembly as claimed in claim 1, wherein the at least one pulley of the holding system comprises first and second pulleys linked to the fixed structure of the nacelle, the second pulley being offset upstream with respect to the first pulley, the flexible link running, from a first end of the flexible link, over the first pulley then over the second pulley, and
wherein the first and second pulleys and the attachment point are arranged such that the attachment point is positioned in line with or in proximity to the second pulley when the rear part is in the upstream position and in line with or in proximity to the first pulley when the rear part is in the downstream position.

3. The aircraft propulsion assembly as claimed in claim 1, wherein the at least one supply system comprises an air take-off system on the powering system.

4. The propulsion assembly as claimed in claim 1, wherein the at least one supply system comprises:
 a main duct in which the fluid provided to inflate the at least one inflatable barrier circulates from upstream to downstream, the main duct comprising a section reduction,
 a first secondary duct having a first end emerging in the main duct upstream of the section reduction, a second end linked to the at least one inflatable barrier and a first valve configured to be in a passing state in which the first valve allows a flow to circulate from the first end to the second end and a blocked state in which the first valve prevents any flow between the first and second ends, and
 a second secondary duct having a first end emerging in the main duct in line with the section reduction, a second end linked to the at least one inflatable barrier and a second valve configured to be in a passing state in which the second valve allows a flow to circulate from the second end to the first end and a blocked state in which the second valve prevents any flow between the first and second ends.

5. The aircraft propulsion assembly as claimed in claim 1, wherein the at least one supply system comprises a chamber containing the fluid provided to inflate the at least one inflatable barrier and connected with the at least one inflatable barrier, and a piston configured to modify a volume of the chamber.

6. The aircraft propulsion assembly as claimed in claim 1, wherein the at least one inflatable barrier comprises at least one non-inflatable zone bracketed by an inflatable zone.

7. The aircraft propulsion assembly as claimed in claim 1, wherein the at least one inflatable barrier comprises at least one first inflatable zone formed as an inflatable plate bracketed by a second inflatable zone formed as an inflatable boot.

8. The aircraft propulsion assembly as claimed in claim 1, wherein the at least one inflatable barrier comprises a single inflatable zone which extends over an entire surface area of the at least one inflatable barrier.

9. An aircraft propulsion assembly comprising:
 a powering system,
 a nacelle surrounding the powering system,
 an annular duct, between the powering system and the nacelle in which, in operation, a flow of air circulates from upstream to downstream,
 a thrust-reversing device comprising at least one lateral aperture, passing through the nacelle and configured to be in an open state or a closed state, and
 at least one inflatable barrier configured to be in a folded down position in which the at least one barrier does not protrude into the annular duct and a deployed position in which the at least one inflatable barrier extends across the annular duct to deflect at least a part of the flow of air circulating in the annular duct toward the at least one lateral aperture, the at least one inflatable barrier having a first edge secured to the nacelle and a second edge at a distance from the first edge and configured to be in contact with the powering system in deployed position;
 wherein the at least one inflatable barrier is configured to be in a deflated state, in the folded down position, in which the at least one inflatable barrier is flexible, and an inflated state, in a deployed position, in which the at least one barrier is substantially rigid or semi-rigid, and
 wherein the thrust-reversing device comprises at least one supply system configured to supply the at least one inflatable barrier with a fluid,
 wherein the nacelle comprises a front part and a rear part that is movable between an upstream position in which the rear part is in contact with the front part and a downstream position in which the rear part is spaced apart from the front part, the lateral aperture being situated between the front and rear parts, and
 wherein the rear part comprises at least one housing that is open toward the front part and configured to at least partially house the at least one barrier in the deflated state,
 wherein the thrust-reversing device comprises at least one passage making it possible to connect the at least one housing and the annular duct when the rear part is in the upstream position and, for each of the at least one passage, at least one hatch that is movable between a closed position in which the at least one hatch shuts the at least one passage and an open position in which the at least one hatch frees the at least one passage.

10. The aircraft propulsion assembly as claimed in claim 9, wherein the thrust-reversing device comprises, for each hatch, an extension secured to each of the at least one hatch and at least one fixed stop secured to a fixed structure of the nacelle, the extension and the fixed stop being arranged such that the at least one hatch swivels automatically into closed position upon a movement of the rear part from the downstream position to the upstream position.

11. The aircraft propulsion assembly as claimed in claim 9, wherein the at least one inflatable barrier comprises at least one reinforcement at least at the second edge.

12. An aircraft propulsion assembly comprising:
 a powering system,
 a nacelle surrounding the powering system,
 an annular duct, between the powering system and the nacelle in which, in operation, a flow of air circulates from upstream to downstream,
 a thrust-reversing device comprising at least one lateral aperture, passing through the nacelle and configured to be in an open state or a closed state, and
 at least one inflatable barrier configured to be in a folded down position in which the at least one inflatable barrier does not protrude into the annular duct and a deployed position in which the at least one inflatable barrier extends across the annular duct to deflect at least a part of the flow of air circulating in the annular duct toward the at least one lateral aperture, the at least one inflatable barrier having a first edge secured to the nacelle and a second edge at a distance from the first edge and configured to be in contact with the powering system in deployed position;
 wherein at least one inflatable barrier is configured to be in a deflated state, in the folded down position, in which the at least one inflatable barrier is flexible, and an inflated state, in a deployed position, in which the at least one inflatable barrier is substantially rigid or semi-rigid, and
 wherein the thrust-reversing device comprises at least one supply system configured to supply the at least one inflatable barrier with a fluid,
 wherein the at least one inflatable barrier comprises at least one orifice passing through the at least one inflatable barrier and configured such that, when the at least one inflatable barrier is in the inflated state, a zone of the annular duct situated upstream of the at least one inflatable barrier is therewith connected with a zone of the annular duct situated downstream of the at least inflatable barrier.

* * * * *